United States Patent [19]

Perelman et al.

[11] Patent Number: 5,701,120
[45] Date of Patent: Dec. 23, 1997

[54] PARTITIONED POINT-TO-POINT COMMUNICATIONS NETWORKS

[75] Inventors: Roberto Perelman, Sunnyvale; Chris Yuan, Fremont, both of Calif.

[73] Assignee: Siemens Business Communication Systems, Inc., Santa Clara, Calif.

[21] Appl. No.: 457,450

[22] Filed: Jun. 1, 1995

Related U.S. Application Data

[63] Continuation of Ser. No. 985,476, Dec. 13, 1992, abandoned.

[51] Int. Cl.$^6$ .................................................. H04J 3/08
[52] U.S. Cl. .................... 340/825.02; 370/401; 340/826; 395/200.15; 395/200.02
[58] Field of Search ................ 340/825.02, 826; 370/94.1, 56, 58.3, 58.1, 85.13, 60, 60.1, 17, 400, 401, 380, 487; 395/200.6, 600, 650, 800, 401, 200.15, 200.02, 858, 427

[56] References Cited

U.S. PATENT DOCUMENTS

| | | | |
|---|---|---|---|
| 3,978,452 | 8/1976 | Barton et al. | 340/172.5 |
| 4,644,496 | 2/1987 | Andrews | 395/800 |
| 4,653,047 | 3/1987 | Vij et al. | 370/85 |
| 4,677,611 | 6/1987 | Yanosy, Jr. et al. | 370/85 |
| 4,833,468 | 5/1989 | Larson et al. | 370/58 |
| 4,845,706 | 7/1989 | Franaszek | 370/62 |
| 4,925,311 | 5/1990 | Neches et al. | 395/650 |
| 4,947,389 | 8/1990 | Eng et al. | 370/85.12 |
| 4,985,889 | 1/1991 | Frankish et al. | 370/94.1 |
| 4,995,035 | 2/1991 | Cole et al. | 370/94.1 X |
| 5,018,133 | 5/1991 | Tsukakoshi et al. | 370/16 |
| 5,048,014 | 9/1991 | Fischer | 370/85.5 |
| 5,088,091 | 2/1992 | Schroeder et al. | 370/94.3 |
| 5,146,561 | 9/1992 | Carey et al. | 395/600 X |
| 5,155,803 | 10/1992 | Barabash et al. | 395/11 |
| 5,179,548 | 1/1993 | Sandesara | 370/85.12 |
| 5,263,157 | 11/1993 | Janis | 395/200.06 |

OTHER PUBLICATIONS

"Supplement to the System Administration Guide Network Feature" a publication by ROLM Systems; document No. G341-1578-00. no date.

*Primary Examiner*—Michael Horabik
*Assistant Examiner*—William H. Wilson, Jr.

[57] ABSTRACT

Partitioned point-to-point communications networks and configured to include a plurality of overlapping network portions, from "fully connected" point-to-point communications networks that are being expanded (to include additional sites), reconfigured and/or which are being upgraded (or otherwise modified) to support new and possibly incompatible communications protocols. The partitioning facilitates adding sites to a fully connected network, particularly where a predetermined maximum network size is reached, without having to redesign the network. In addition, modifying communication protocols used in such a network (for example, when upgrading a portion of the network to support a new feature), without having to change protocols for all sites at once is facilitated. Further embodiments comprise (a) processes which allow fully connected point-to-point communications networks to grow without requiring that every site in the network maintain information concerning every other network site, and (b) partitioned point-to-point communications networks which are products of any of these processes.

26 Claims, 5 Drawing Sheets

| FIELD NAME | EXPLANATION: |
|---|---|
| SITE NUMBER: | NUMBER THAT UNIQUELY IDENTIFIES THIS SITE IN THE NETWORK |
| SITE NAME: | NAME THAT UNIQUELY IDENTIFIES THIS SITE IN THE NETWORK |
| TIME ZONE: | IDENTIFIES THE TIME ZONE OF THE SITE BY ITS NUMBER OF HOURS WEST OF GREENWICH MEAN TIME |
| REMOTE ACCESS NUMBER: | IDENTIFIES A NUMBER THAT THE SITE WANTED TO DISTRIBUTE TO ALL OTHER SITES (SUCH AS THE TELEPHONE NUMBER OF THE SYSTEM ADMINISTRATOR) |
| SITE ACTIVE FLAG: | IDENTIFIES IF THE SITE IS ACTIVE IN THE NETWORK |
| NUMBER OF NODES: | IDENTIFIES THE NUMBER OF LAN NODES AT THE SITE |
| PRIMARY ACCESS #: | IDENTIFIES THE PRIMARY ACCESS NUMBER FOR THE SITE |
| ALTERNATE ACCESS #: | IDENTIFIES THE ALTERNATE ACCESS NUMBER FOR THE SITE |
| TIME THIS INFORMATION WAS LAST MODIFIED: | IDENTIFIES THE TIME AND DATE THAT THIS SITE PROFILE WAS MODIFIED |

PARTITIONED POINT-TO-POINT COMMUNICATIONS NETWORKS

CROSS-REFERENCE TO RELATED APPLICATION

This is a continuation of Ser. No. 07/985,476 filed Dec. 3, 1992, now abandoned.

BACKGROUND OF THE INVENTION

1. Field of the Invention

The invention relates generally to point-to-point communications networks, that is communications networks which include a plurality of sites each of which, whenever needing to communicate with another site in the same network, connects directly to the desired target site. In such networks the desired communications path between a pair of sites is established without having to go through any intermediate network sites.

More particularly, the invention relates to processes which create partitioned point-to-point communications networks, configured to include a plurality of overlapping network portions, from "fully connected" point-to-point communications networks that are being expanded (to include additional sites), reconfigured and/or which are being upgraded (or otherwise modified) to support new and possibly incompatible communications protocols.

A "fully connected" point-to-point communications network is defined herein to be a point-to-point communications network in which every site is capable of directly communicating with each and every other site in the network.

The partitioning contemplated by the invention, along with the other process steps set forth hereinafter, facilitates adding sites to a fully connected network, particularly where a predetermined maximum network size is reached, without having to redesign the network. In addition, the invention facilitates modifying communication protocols used in such a network (for example, when upgrading a portion of the network to support a new feature), without having to change protocols for all sites at once.

Further aspects of the invention are directed to processes which allow fully connected point-to-point communications networks to grow without requiring every site in the network to maintain information concerning every other network site; and providing partitioned point-to-point communications networks which are products of the aforementioned processes.

Thus, for example, one aspect of the invention is directed to providing a partitioned point-to-point communications network which is capable of supporting a plurality of communications protocols (even incompatible protocols), in the event that a given underlying fully connected point-to-point communications network (which serves as the "input" to a process contemplated by the invention), is expanded, reconfigured, upgraded or otherwise modified.

2. Description of the Prior Art

In well known point-to-point communications networks used, for example, in telecommunications systems, computer networking applications, etc., each and every site needs to have information about every "other site" it can engage in communications with. One example of such a network is an interconnected set of Local Area Networks (LAN), where each network site is a LAN. Each site in the networks which are the subject of the present invention, includes a set of one or more nodes. In the case of a LAN the nodes could, for example, represent telephone stations, computer assisted work stations, voice mail equipment, etc.

Depending on the underlying communications media (fiber optic link, microwave link, etc.), the "other site" information maintained by each network site typically includes such items as an access number associated with each other site coupled to a given site (for example, a telephone number), media dependent data rate information (typically dependent on the characteristics of the communications media), other site name, and/or other site identifier information.

Each site in known point-to-point communications networks typically maintains the aforementioned information in a local database. Using terminology familiar to those skilled in the art, the information is often stored in a "relation" referred to as a "site profile". This relation typically has one "record" (also often referred to as a "tuple"), per site in the network.

To add a site to an existing network (referred to by those skilled in the art as "attaching" a new site to the network), the following steps (referred to hereinafter as "Prior Art Attachment Steps (a)-(c)") presently could be performed:

(a) as a first step, each new site must create a record (in a site profile relation that it maintains), that includes information about itself. This step is typically performed by a system (or network) administrator. The "type" information placed in the record (for example, the new site's access number, etc.), should be consistent with the type information maintained in the site profiles for the existing sites in the network;

(b) each new site being added to the network then calls any one other site already on the network (this step also typically requires system administrator involvement, to for example, manually supply the required access number to call), and retrieves information about every existing site in the current network from the called site's, site profile relation. That is, the called site sends all tuples in its site profile relation to the calling site; and then (c) the new site automatically calls every site for which it just received a site profile record, and sends all required information about itself to the called sites, i.e., the calling site (the new site) sends its own site profile record.

Similarly, as relevant information about a site changes over time, this information is propagated by having the changed site call all other sites to which it is connected (all sites in a fully connected network), and send its modified site profile record, so that all connected sites may continue to communicate with each other.

Several problems exist with using point-to-point networks as presently designed and managed, especially when considering expanding a fully connected network and/or adding, modifying or otherwise upgrading communications protocols used within such a network.

More particularly, since fully connected point-to-point networks are typically designed to have a predetermined maximum network size, adding more sites once the network reaches that size presently requires a network redesign which affects all network sites. Similarly, changing the communication protocol (or protocols) supported in a fully connected point-to-point communications network presently requires changing all sites at once, if all sites are to remain in communication.

The cost and logistics involved in upgrading all sites in a fully connected network to achieve network expansion objectives and/or to realize protocol modification objectives, can be very significant. This is because unless every site is upgraded simultaneously (which might not even be possible), there is a window during which the network is in transition. During the transition, communication between different sites may be disrupted.

It should be noted that techniques for increasing the maximum number of sites allowed in a point-to-point network beyond the maximum number supported (where the existing point-to-point topology is required to be kept intact), are known. However, such techniques typically require that the network software and/or hardware at all sites be changed.

Alternatively, those skilled in the art will readily appreciate that a network can be expanded beyond a predetermined maximum size by, for example, choosing a different network topology, e.g., breaking up the network into multiple networks, connected via bridges, routers, and/or gateways, etc. Using this approach to network expansion, point-to-point connectivity is often sacrificed, which in some cases is unacceptable. In addition, the transition period from the original topology to the new one can also be disruptive to the users of the network.

Similarly, if a new communication protocol is needed in order to support some new feature, the concept of a "protocol version" can and has been used. In such situations (where different protocol versions are used by different sites), when two sites begin to communicate, they negotiate to use a common protocol that both support. This can be a useful approach in many systems; however, there are many conditions where such an approach does not solve protocol problems, such as where:

(a) the protocol incompatibilities are such that the sites can not even communicate to the point where protocol negotiations take place; or (b) the sites are not able to agree on a common protocol that both support.

Alternatively, all sites could be upgraded every time to support the latest communication protocol versions. This approach also suffers from cost and logistics problems since, once again, unless every site is upgraded simultaneously (which might not be possible), there is a window during which the network is in transition, with incompatible protocols being used by different sites.

Thus, with respect to the prior art, for expanding a fully connected point-to-point communications network beyond its designed maximum size, adding a new communication protocol to a network, etc., either:

(a) all sites are required to undergo a potentially costly, logistically difficult and disruptive software and/or hardware upgrade, or (b) the topology of the point-to-point network would require the addition of bridges, routers, and/or gateways, possibly resulting in the network loosing its point-to-point characteristics.

Accordingly, for all of the reasons set forth hereinabove, it would be desirable to provide processes which facilitate adding sites to fully connected point-to-point communications networks (and/or reconfiguring such networks), particularly where a predetermined maximum network size is reached, without having to redesign the network.

Furthermore, it would be desirable to provide processes which facilitate modifying communication protocols used in such a network (for example, when upgrading a portion of the network to support a new feature), without having to change protocols for all sites at once or disrupt communications between all sites on the network.

Further yet, it would be desirable to be able to provide processes which allow fully connected point-to-point communications networks to grow without requiring every site in the network to maintain a potentially large site profile relation (i.e., one with an excessive number of records) in its database.

Still further, it would be desirable to provide partitioned point-to-point communications networks which are a product of the aforementioned processes. Such network architectures would inherently permit a plurality of communications protocols (even incompatible protocols), to be supported in parallel; would allow a fully connected point-to-point communications network to be expanded beyond a predetermined maximum size, etc.

Examples of prior art systems in which the present invention may be applied, systems which practice one or more of the aforementioned prior art approaches to network expansion or protocol modification, etc., or which utilize other well known techniques to attain such objectives, include those set forth in the references described immediately hereinafter.

The details of a voice mail system in which the present invention may be applied is taught in a publication by ROLM Systems (a Siemens Company), entitled "Supplement to the System Administration Guide—Network Feature", ROLM document number G341-1578-00. In this publication, hereby incorporated by reference, a network is described within which each site includes voice mail equipment. A fully connected network of such equipment may, for example, be expanded (i.e., have a new voice mail compatible site added), or have a supported communications protocol be upgraded, etc., in accordance with the teachings of the invention as set forth hereinafter.

U.S. Pat. No. 4,947,389, describes a system which employs the prior art technique of being able to send a packet between network sites which do not have a direct link by multihopping the packet serially through one or more intermediate sites.

By way of contrast, one aspect of the present invention (as will be explained in greater detail hereinafter), is directed to processes which include the step of partitioning a network such that a subset of the networks sites do not have any knowledge about the existence of some other subset of sites in the same network. In such cases, the partitioning contemplated by the invention obviates the need to employ the multihopping concept when adding a site to an existing point-to-point communications network.

U.S. Pat. No. 5,088,091, U.S. Pat. No. 4,845,706, and U.S. Pat. No. 4,833,468, are all directed to networks which utilize switches to accomplish network partitioning. As will be seen hereinafter, the present invention accomplishes network partitioning, for the purposes set forth hereinabove, without requiring the use of switches.

U.S. Pat. No. 4,995,035, is directed to a network partitioning scheme used for network management purposes. The teachings of this reference are not, however, directed to the network expansion and communications protocol modification processes; the type of processes contemplated by the present invention.

U.S. Pat. No. 5,018,133, teaches the use of a hierarchical tree structure to accomplish the partitioning of a network. This structure, as will be seen hereinafter, is not employed by the processes taught herein.

U.S. Pat. No. 5,048,014, teaches a dynamic network reconfiguration technique, applicable only to a token passing LAN, which allows additional nodes to be added to the LAN beyond a predefined maximum number of nodes.

This reference (U.S. Pat. No. 5,048,014) does not, however, teach, claim or even suggest processes for expanding fully connected point-to-point communications networks (or modifying communications protocols used in such networks), utilizing processes which partition the network into overlapping subnetworks, where the subnetworks are defined to each include sites which do not have to communicate with every other site in the network. This aspect of the present invention will also be described in the Detailed Description section set forth herein.

For all of the reasons set forth hereinabove, including the present state of the art as exemplified by the aforementioned references, it would be desirable to provide the aforementioned processes, and partitioned point-to-point communications networks that result from applying such processes to fully connected point-to-point communications networks, to achieve network expansion, upgrade and other objectives as more particularly set forth hereinafter.

SUMMARY OF THE INVENTION

Accordingly, it is a primary object of the invention to provide processes which facilitate adding sites to fully connected point-to-point communications networks, particularly where a predetermined maximum network size is reached, without having to redesign the network.

It is a further object of the invention to provide processes which facilitate adding or modifying communication protocols used in such a network without having to change protocols for all sites at once or disrupt communications between all network sites.

Still further, it is an object of the invention to provide processes which allow fully connected point-to-point communications networks to grow without requiring every site in the network to maintain a potentially large site profile relation (i.e., one with an excessive number of records) in its database.

Yet another object of the invention is to provide processes as described hereinabove, which are readily implementable in software to facilitate automating the process of extending, reconfiguring and/or upgrading a fully connected point-to-point communications network.

Further yet, it is an object of the invention to provide partitioned point-to-point communications networks which are a product of the aforementioned processes.

In accordance with one illustrative aspect of the invention, a process (method) for attaching a new set of sites to a fully connected point-to-point communications network having a predetermined maximum number of sites associated therewith, wherein at least one site in the new set of sites does not need to communicate with every site in the fully connected point-to-point communications network, comprises the steps of: (a) creating a partitioned network combining the sites in the new set of sites with the sites in the communications network, wherein the sites in each partition form a fully connected subnetwork and further wherein any site which is in at least two fully connected subnetworks is included in an overlapping portion of at least two partitions; (b) identifying the sites included in the overlapping portion of at least two partitions; and (c) upgrading each site that is in an overlapping portion of at least two partitions to facilitate point-to-point communications between that site and all other sites in the same overlapping partitions.

The various process steps set forth hereinabove will be described in greater detail hereinafter; but for now it should be understood that the processes contemplated by the invention involve accessing the aforementioned site profile information maintained at each network site, and maintaining (in individual site profile records) information (additional information not maintained in prior art site profile records) regarding all partitions within which a given site can engage in communications with other sites.

The illustrative process set forth hereinabove (and the other processes contemplated by the invention as described hereinafter), may be implemented manually; that is a hard-wired network may be physically reconfigured (rewired), data may be manually inserted into site profile data structures, etc., in accordance with the various process steps to be described herein, to achieve the various stated objects of the invention.

However, according to a preferred embodiment of the invention, the aforementioned processes may be implemented in software and be included as part of well known network administration programs which manipulate the site profile data maintained at each site in point-to-point communications networks, such as the network administration programs resident at each site of the exemplary voice mail system described in the incorporated reference.

The above described process (and indeed the invention itself) is based on the insight that in many instances, within a point-to-point network, not all sites need to communicate with every other site. Therefore, of all the universe of sites in the complete network, subsets of sites which must have the ability to communicate with one another can be identified.

The complete network may then be broken up into (or thought of as a set of) overlapping partitions with each partition being made up of sites that can communicate with every other site in the partition. The overlapping partition structure results so long as at least one site does not need to communicate with every other site in the resulting partitioned (complete) network.

The key concept is that sites within a partition all know about each other (i.e., they have the site profile record for each other), and may all communicate with one another. Since partitions overlap, some sites belong to more than one partition. Sites know about every other site in all partitions that they belong to (i.e., they have the site profile record for every other site in all partitions that they belong to), and therefore may communicate with each of those sites.

A further aspect of the invention is directed to a process for extending a fully connected point-to-point communications network, which has a predetermined maximum number of sites associated therewith and a site profile record associated with each site, by attaching a new set of sites to the network, wherein at least one site in the new set of sites does not need to communicate with every site in the fully connected point-to-point communications network and further wherein at least one site in the new set of sites supports a first communications protocol that is different from a second communications protocol supported by the network.

An illustrative set of process steps for realizing this aspect of the invention include the steps of: (a) combining the new set of sites with the sites in the communications network to form a plurality of overlapping network partitions defined such that (1) each site within a given partition may communicate with every other site in the given partition, (2) each site within a given partition has the site profile record for every other site within the given partition, and (3) each site within a given overlapping portion of a set of overlapping network partitions may communicate with every other site in the set of overlapping network partitions; (b) identifying the sites included in the set of overlapping network partitions; and (c) upgrading each site included in the set of overlapping network partitions to facilitate point-to-point communications between that site and all other sites in the same overlapping partitions and to support both the first and second communications protocols.

Further aspects of the invention are directed to processes which allow fully connected point-to-point communications networks to grow without requiring every site in the network to maintain a potentially large site profile relation (i.e., one with an excessive number of records) in its database; and partitioned point-to-point communications network structures per se which are products of the aforementioned processes.

The invention features: (1) the ability to allow the total number of sites within a point-to-point network to exceed the maximum number originally supported (where at least one site in the expanded network does not need to communicate with every other site in the expanded network); (2) does not require all sites in an existing network to be upgraded to the latest communication protocol (assuming once again that at least one site in the expanded network does not need to communicate with every other site in the expanded network); (3) inherently keeps to a minimum the size of the database containing site profile information maintained at each site; (4) reduces the number of sites that need to be called when the site profile record for one site changes; and (5) as a side benefit, depending on the network configuration, protects against messages being sent across certain links by users of the network, when the sites at both ends of those links are not supposed to be communicating with one another (referred to hereinafter as the network's inherent "Protection Feature").

These and other objects, embodiments and features of the present invention and the manner of obtaining them will become apparent to those skilled in the art, and the invention itself will be best understood by reference to the following Detailed Description read in conjunction with the accompanying Drawing.

BRIEF DESCRIPTION OF THE DRAWING

FIG. 4 depicts an illustrative partitioned point-to-point communications network which can be constructed utilizing the processes contemplated by the invention. The complete network depicted in FIG. 4 may be viewed as a partitioned network that includes overlapping partition portions, where the subset of network sites within a given partition have the ability to communicate with every other site in the given partition; and in the case of sites belonging to overlapping partitions portions, such sites have the ability to communicate with every site in the domain of the individual partitions that overlap.

DETAILED DESCRIPTION

Figure 1:
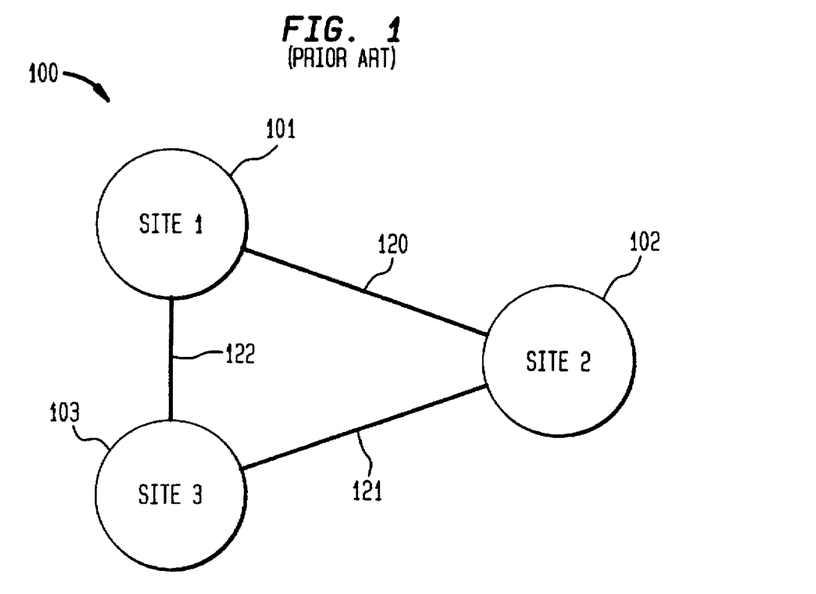
FIG. 1 illustrates a prior art network architecture consisting of 3 "fully connected" sites.

As indicated hereinabove, FIG. 1 illustrates a prior art network architecture consisting of 3 "fully connected" sites. Such a network, having an arbitrary size n (n sites), and a predetermined maximum size of N sites, may be considered to be the "input" for the processes contemplated by the invention. In other words, the types of networks which the processes to be described hereinafter are suitable for extending, upgrading, etc., are: (a) fully connected point-to-point communications networks, such as the one illustrated in FIG. 1, and (b) other point-to-point communications networks within which a fully connected subnetwork can be identified before applying the processes taught herein to the identified subnetwork and a set of sites to be attached thereto.

FIG. 1 depicts fully connected point-to-point communications network 100 which is made up of 3 sites (n=3), shown in FIG. 1 as sites 101, 102 and 103. This prior art communications network meets the definition of a fully connected network since each and every site in the network is capable of directly communicating with each and every other site in the network via data paths 120, 121 and 122 using an arbitrary type of communications media (wire, broadcast link, circuit switched telephone line, fiber optic link, etc.)

Figure 2:
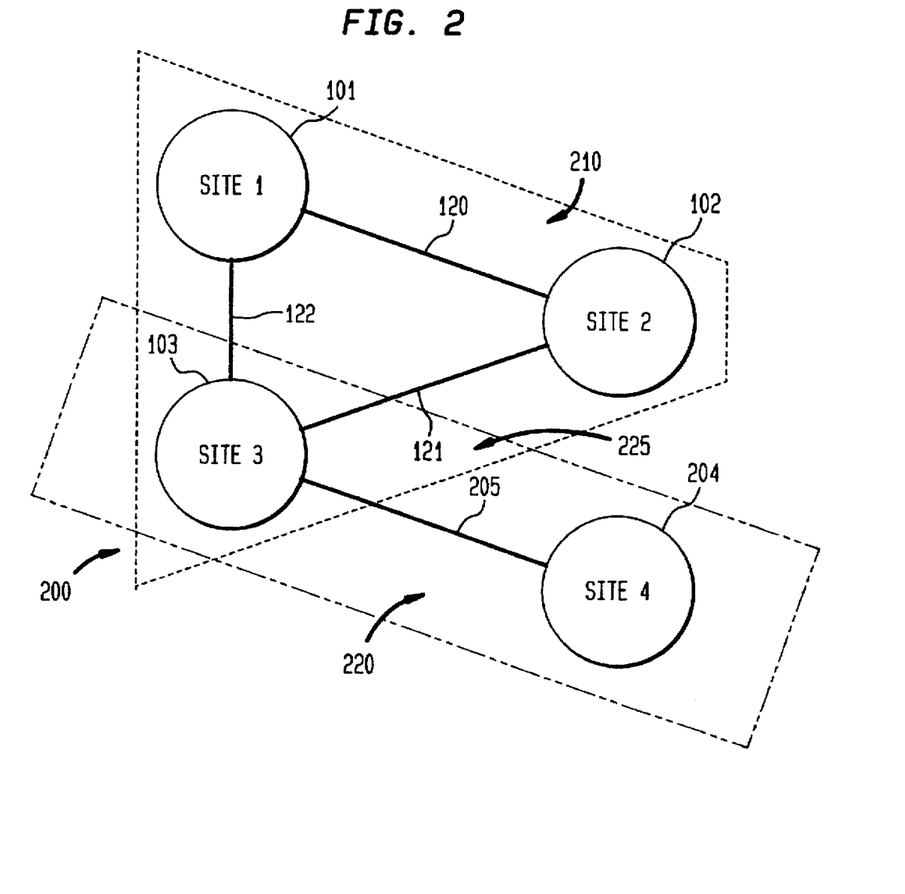
FIG. 2 illustrates the architecture of a partitioned point-to-point communications network which results from attaching a site to the network depicted in FIG. 1, where the additional site does not need to engage in communication with every site of the original fully connected network.

Reference should now be made to FIG. 2 which illustrates the architecture of a partitioned point-to-point communications network, 200, which results from attaching a site (site 204 in FIG. 2) to the network depicted in FIG. 1, via data path 205. The additional site is depicted as being able to engage in direct communications with only one of the sites of original fully connected network 100, namely site 103.

Partitioned point-to-point network 200 is shown to include two overlapping partitions. Partition 210 includes all of the sites of the original, underlying, fully connected network 100 shown in FIG. 1. Partition 220 includes only sites 103 and 204.

Site 103 in the overlapping portion of partitions 210 and 220 (shown as overlapping portion 225 in FIG. 2), may communicate directly with the sites in the domains of the individual partitions which overlap. In other words, site 103 may communicate directly with sites 101, 102 and 204. Sites 101 and 102 may only communicate directly within partition 210 (over the original fully connected network); while site 204 may only communicate directly with site 103 (since both are within partition 220).

Having illustrated the concept of a fully connected point-to-point communications network and a partitioned point-to-point communications network (with reference to FIGS. 1 and 2), reference should now be made to FIG. 3 for an illustration of a site profile record (maintained in a site profile relation), which contains data used by the processes to be described hereinafter.

Figure 3:
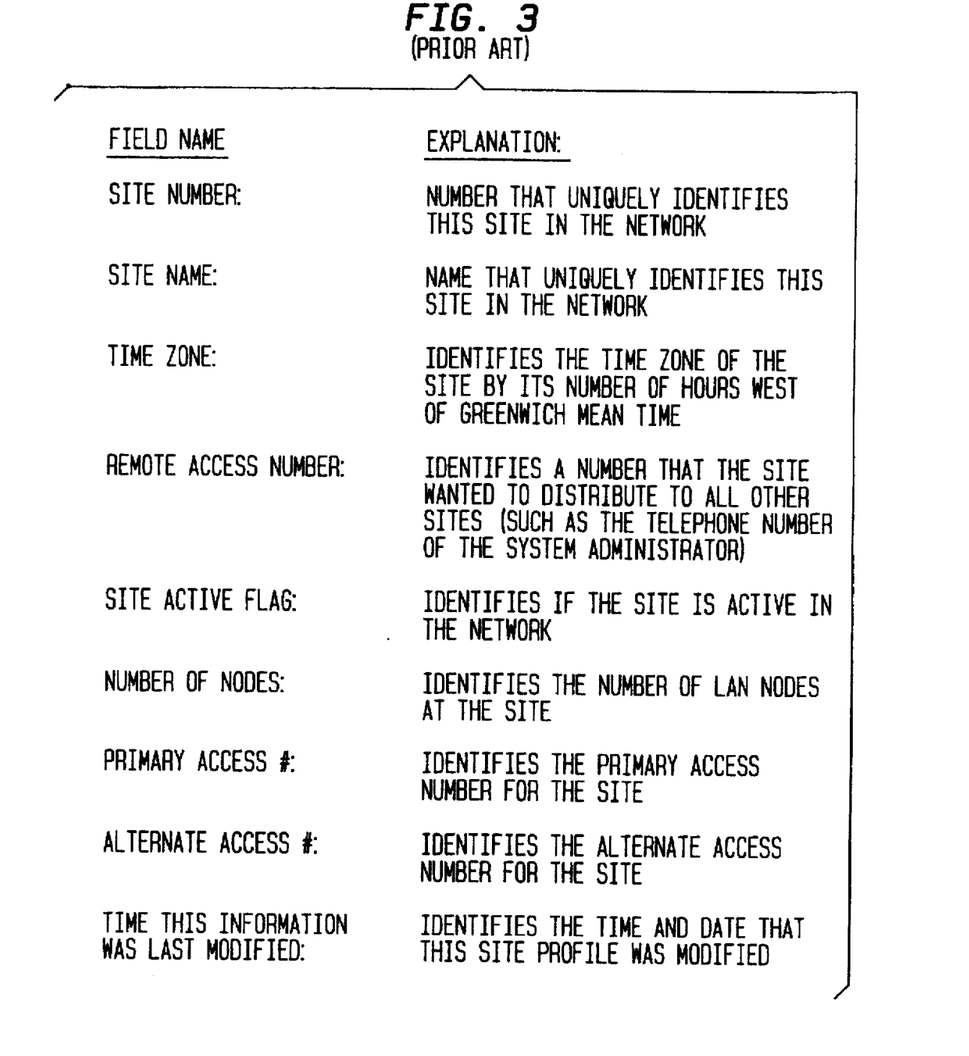
FIG. 3 depicts the contents of a portion of an illustrative site profile record which can be used in performing the processes (and in realizing the partitioned networks structures), contemplated by the invention. In fact, the site profile record information depicted in FIG. 3 is part of the global site profile relation maintained at each site of the exemplary voice mail system described in the incorporated reference, and is modified (as described hereinafter) to include the aforementioned additional information regarding all partitions within which a given site can engage in communications with other sites.

As indicated hereinabove, the site profile record information depicted in FIG. 3 is maintained as part of the site profile relation at each site of the exemplary voice mail system described in the incorporated reference, and is modified (as described hereinafter) to include additional information regarding all partitions within which a given site can engage in communications with other network sites.

In particular, FIG. 3 illustrates that a typical prior art site profile record contains such information as a "site number" (sometimes referred to as a "site identifier"), which can be used to uniquely identify a site in a network; access numbers which can be used, for example, to reach a given site; and other data types (not necessarily needed in practicing the present invention; but shown for the sake of completeness), such as the time zone within which a given site is located, etc.

These data types and how they are used in managing a point-to-point communications network are fully described in the incorporated reference and will not be further discussed herein except to say that two additional fields of data (not included in the exemplary prior art site profile record depicted in FIG. 3), are used in a preferred embodiment of the invention. These additional fields are used to enable the processes contemplated herein to determine a "Primary Partition" to which each site is assigned, and "Other Partitions" (sometimes referred to as "Secondary Partitions"), within which a given site may engage in direct site to site communications.

Figure 4:
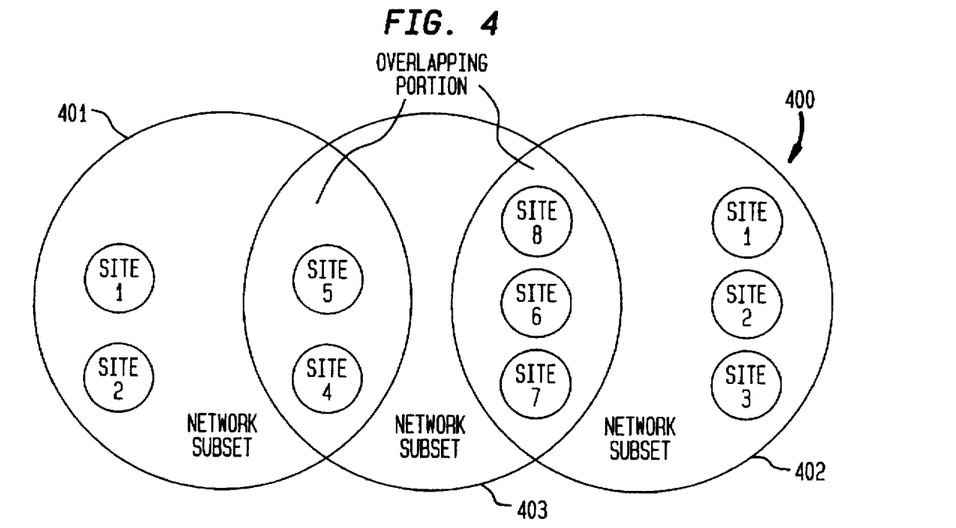

Reference should now be made to FIG. 4 which, together with the explanation to follow, will illustrate how to construct the type of partitioned network that results from applying the processes to be described hereinafter to fully connected point-to-point communication networks.

The example of how to build the partitioned network described with reference to FIG. 4 will not be in terms of preferred process steps per se which, in their preferred form, are described hereinafter with reference to FIGS. 5-7. Rather, the illustration of how to build a partitioned network, discussed in the context of FIG. 4, is designed to teach the operating principles behind certain process steps utilized in preferred embodiments of the invention to fabricate the desired partitioned networks.

As indicated hereinbefore, FIG. 4 depicts an illustrative point-to-point communications network which (the complete network) may be viewed as a partitioned network that includes (1) overlapping partition portions, where the subset of network sites within a given partition have the ability to communicate with every other site in the given partition; and (2) in the case of sites belonging to overlapping partitions portions, sites having the ability to communicate with every site in the domain of the individual partitions that overlap.

Again, as indicated hereinabove, the invention is based on the insight that in many instances, within a point-to-point network, not all sites need to communicate with every other site. Therefore, of all the universe of sites in the complete network, subsets of sites which must have the ability to communicate with one another can, as illustrated in FIG. 4, be identified.

The complete network, 400, depicted in FIG. 4 (ten sites in total), may be broken up into (or thought of as a set of) overlapping partitions with each partition being made up of sites that can communicate with every other site in the partition. The overlapping partition structure results so long as at least one site does not need to communicate with every other site in the resulting partitioned network.

FIG. 4 shows 3 partitions. Exemplary partition 401 (the partition depicted on the left in FIG. 4) consists of 4 illustrative sites, identified as 1, 2, 4 and 5. Exemplary partition 402 (the partition depicted on the right in FIG. 4) consists of 6 illustrative sites, identified as 1, 2, 3, 6, 7 and 8. Finally, exemplary partition 403 (the partition shown in the center of FIG. 4) consists of 5 illustrative sites, identified as 4, 5, 6, 7 and 8.

As indicated hereinbefore, a key concept to be recognized, in order to understand the principles of the invention, is that sites within a given partition (for example, partition 401) all know about each other (i.e., they have the site profile record for each other in their respective site profile relations), and may all communicate with one another.

Since partitions overlap, some sites belong to more than one partition (such as sites 4 and 5 which belong to partitions 401 and 403 as shown in FIG. 4, etc.). Sites know about every other site in all partitions that they belong to (i.e., they have the site profile record for every other site in all partitions that they belong to), and therefore may communicate with each of those sites.

Sites in non-overlapping partitions do not know about each other's existence (i.e., they do not have the site profile record for each other), and can therefore not communicate. In fact, as FIG. 4 illustrates, site identifiers may be the same for such sites without any ill effects. Specifically, FIG. 4 shows that sites 1 and 2 in partition 401 may co-exist in network 400 with sites having the same identifiers (sites 1 and 2 in partition 402), since partitions 401 and 402 do not overlap.

Sites that belong to more than one partition must be assigned site identifiers that are unique across all partitions where sites that can communicate with them reside. So in the case of network 400 depicted in FIG. 4, sites 4, 5, 6, 7 and 8, have been assigned site numbers (site identifiers) which are unique across all three partitions (401-403) shown in FIG. 4.

An illustration of how a network like the one depicted in FIG. 4 (network 400) might be built will now be set forth for the purpose, as indicated hereinabove, of illustrating several of the process steps that will be called for in the processes contemplated by the invention (which are described in detail hereinafter with reference to FIGS. 5-7).

As a preliminary step, the fully connected point-to-point communications subnetworks, depicted in partitions 401 and 402 respectively, could be constructed independently utilizing Prior Art Attachment Steps (a)-(c), referred to hereinabove as part of the description of existing techniques for generally attaching sites to (and forming) point-to-point networks.

Next, the subnetworks (in partitions 401 and 402 of the network being built), referred to hereinabove, can be joined. It should be noted that the four sites within partition 401 (sites 1, 2, 4 and 5), form a fully connected point-to-point communications network, and the six sites belonging to partition 402 (sites 1, 2, 3, 7, 8 and 9), also form a fully connected point-to-point communications network. The sites that will eventually belong to partition 403 (sites 4, 5, 6, 7 and 8), also form a fully connected point-to-point communications network; however, not all of the sites in partition 403 need to communicate with all the sites in either of partitions 401 and 402.

In order to join partitions 401 and 402 (and form partition 403), the sites in one partition that need to talk to sites in the other partition must be identified. This will be seen hereinafter to be one of the important process steps contemplated by the invention.

Before continuing with the illustrative example of how to construct a partitioned network, like network 400, it should be noted that, as mentioned hereinbefore, one advantage of the present invention is the fact that not all sites in a network needed to upgrade whenever communications protocols are being enhanced (so long as at least one site in the expanded (or modified) network does not need to communicate with every other site in the new network).

An example of this may be illustrated with reference to FIG. 4. The concept of communicating with sites in different subnetworks itself requires some communication protocol changes (to be described hereinafter), if it is assumed that the existing 10 sites in network 400 do not from the start support such a feature. One benefit of utilizing this invention now becomes clear; only those sites which actually will be in more than one partition need to be upgraded. For the rest of the sites such an upgrade would be optional.

This means that sites 4, 5, 6, 7 and 8 depicted in FIG. 4, all "understand" about partitioned networks. As part of this "understanding" (and now continuing with the illustrative steps required to build network 400), it must be possible to add two pieces of information to their own site profile records (the records for sites 4–8), namely:

(a) what the site's "Primary Partition" is (for example, sites 4 and 5 belong to primary partition 401; and sites 6, 7 and 8 belong to primary partition 402); and (b) what "Other Partitions" (besides the primary one) these sites can communicate with (for example, sites 4, 5, 6, 7 and 8 in FIG. 4 may also communicate with partition 403).

Additionally, according to a preferred embodiment of the invention, all other records in the site profile relation (at each site) are initialized by setting a new Primary Partition field (maintained for each site record stored in a given site's site profile relation), to the same value as its own Primary Partition field; and a new Other Partitions field is initialized to a null value.

Thus, for example, sites 4 and 5 in FIG. 4 modify their copies of the site profile records for sites 1 and 2 so that each Primary Partition field is set to "401", and each Other Partitions field is set to a null value. Sites 6, 7 and 8 in FIG. 4 take a similar action (via, for example, a network administration program resident at each site, including software for performing the method steps contemplated herein), by modifying their copies of the site profile records for sites 1, 2 and 3 (in partition 402) so that each Primary Partition field is set equal to "402", and each Other (or Secondary) Partitions field is set to a null value.

The next step in the illustrative process for building network 400 is for sites 4, 5, 6, 7 and 8 to "attach" one by one to the new partition being created, namely partition 403. This step can be performed by utilizing the Prior Art Attachment Steps (a)–(c), referred to hereinabove, with two important differences.

(1) Assuming site "i" is attaching, by calling site "j" (as described in prior art attachment step (b)); site "i" (according to the processes contemplated by the invention and used in building illustrative network 400), discards those site profile records received from "j" which have their Primary Partition field set to a different value than its own Primary Partition filed AND which have an Other Partitions field which does not include any of the partitions that it (i.e., site "i") can communicate with.

For example, with reference to FIG. 4, site 5 does the first attach within partition 403 by calling site 4. It does not discard any of the received site profile records (sites 1, 2 and 4). Next site 6 attaches to site 4. It keeps the received site profile records for sites 4 and 5, but discards the received site profile records for sites 1 and 2, because they belong to a different Primary Partition (partition 401) than its own (partition 402), AND the Other Partitions field does not include either partitions 402 or 403 (in fact that field is empty). As a result, site 6 will not communicate with site 1 and 2 in partition 401. This process continues for sites 7 and 8.

Using an alternate example, if the attachment of partition 403 started with site 6 calling site 4, site 6 would discard the site profile record for sites 1 and 2 (of partition 401), for the same reasons indicated hereinbefore. It would also discard the site profile record for site 5, because site 4 had not yet updated that record with the new information for site 5.

(2) Site "i" (performing prior art attachment step (c)), calls all sites for which it just received (and did not discard) a site profile, and sends its own site profile record. However, it does not send the two new fields (the Primary Partition and Other Partitions fields) to those sites whose site profile record have their Other Partitions field set to a null value.

Continuing with the original example, after site 5 attaches to site 4, it does not send the two new fields to sites 1 and 2.

This completes the illustrative description of a process for building network 400 by, in effect, attaching new sites to an existing fully connected point-to-point communications network, where the fully connected network(s) are, as demonstrated hereinabove, the subnetworks forming partitions 401 and 402.

FIG. 4 may now be further utilized to illustrate several additional advantages obtained by performing the types of processes contemplated by the invention.

Assume that network 400 (constructed from the 10 sites depicted in FIG. 4), was previously constrained to consist of a maximum of 8 sites because the number of site profile records that could be stored in any local database was limited to 8 records. This restriction has been enforced in that none of the 10 sites depicted in FIG. 4 knows about (i.e., has site profile records for) more than 7 other sites. Yet the total number of sites in the network is 10. So a network (like network 400) has been shown which, as a result of practicing processes contemplated by the invention, has the ability to allow more sites than the original network maximum number of sites.

It has already been demonstrated that by utilizing partitioned networks, not all sites need to support a "latest" communication protocol. Another example of an advantage gained by utilizing the processes contemplated by the invention is as follows. Supposing that all sites in partition 402 desire a new networking feature which can be achieved by the introduction of a new, incompatible, protocol (incompatible with the protocols supported by partitions 401 or 403). Naturally all sites in partition 402 would be upgraded, but only sites 4 and 5 in partitions 401 need to be upgraded. Sites 1 and 2 in partition 401 may stay the same.

If needed, partition 402 could itself be broken up into additional partitions, if any sites in it do not require the new feature and do not wish to go through the upgrade process.

Yet another advantage of utilizing the processes contemplated by the invention and the partitioned point-to-point communications network that results therefrom, relate to the smaller number of site profile records that need to be maintained in a resulting network's site oriented databases. Even if the new network supported 10 sites (as illustrated by network 400 in FIG. 4), by partitioning network 400 in the manner shown, each site only needs to keep a smaller number of site profile records in its database, ranging from as few as 4 records (for sites 1 and 2 in partition 401) to a maximum of 8 (for sites 6, 7, 8 in overlapping partitions 402 and 403)).

It should also be noted with reference to FIG. 4 that when and if site 1 in partition 401 changes name (for example), only sites 2, 4 and 5 in partitions 401 and 403 need to be called.

Finally, a subscriber at site 1 in partition 401 cannot send messages to subscribers at sites 1, 2 or 3 in partition 402, nor to subscribers at sites 6, 7 or 8 in overlapping partitions 402 and 403, resulting in the network Protection Feature mentioned hereinbefore.

Figure 5:
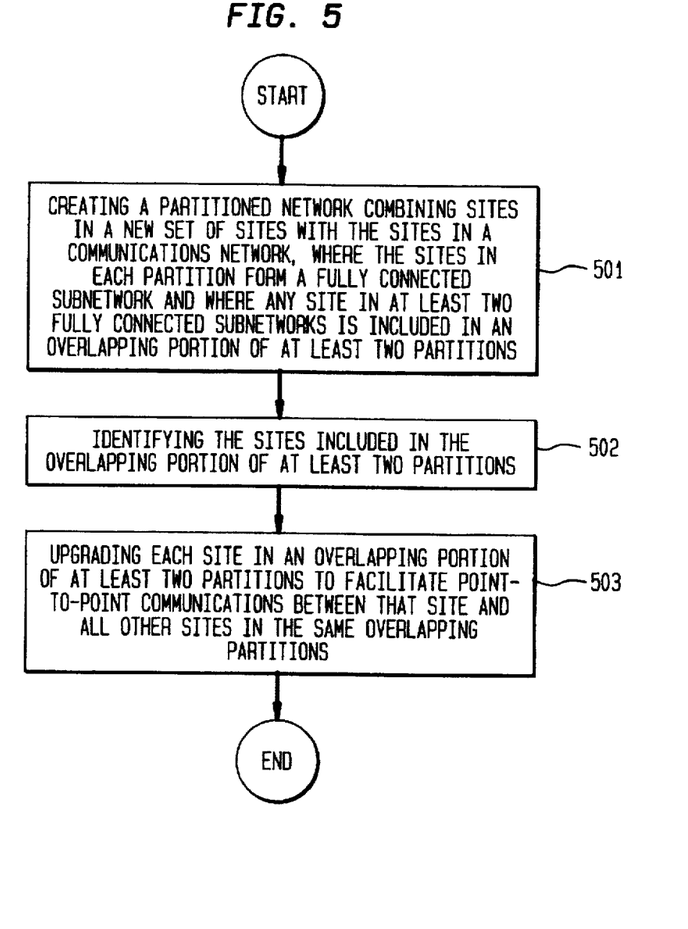
FIG. 5 illustrates, in the form of a flowchart, an example of the process steps contemplated by one embodiment of the invention for attaching a new set of sites to a fully connected point-to-point communications network.

Reference should now be made to FIG. 5 which illustrates, in the form of a flowchart, an example of the process steps contemplated by one embodiment of the invention. The depicted process may be used for attaching a new set of sites to a fully connected point-to-point communications network.

Those skilled in the art will readily appreciate that the process described hereinbefore with reference to FIG. 4 (where 3 partitions are depicted), for creating network 400, is in effect a process for adding a new set of sites to fully connected point-to-point communications networks (like those defined in partition 401 and 402), to form the new network structure.

Looking at the invention from this elemental prospective, a novel process for attaching a new set of sites to a fully connected point-to-point communications network having a predetermined maximum number of sites associated therewith, wherein at least one site in the new set of sites does not need to communicate with every site in the fully connected point-to-point communications network, comprises the steps of:

(a) creating a partitioned network combining the sites in the new set of sites with the sites in the communications network, wherein the sites in each partition form a fully connected subnetwork and further wherein any site which is in at least two fully connected subnetworks is included in an overlapping portion of at least two partitions (as schematically represented by step 501 in FIG. 5);

(b) identifying the sites included in the overlapping portion of at least two partitions (as schematically represented by step 502 in FIG. 5); and (c) upgrading each site that is in an overlapping portion of at least two partitions to facilitate point-to-point communications between that site and all other sites in the same overlapping partitions (as schematically represented by step 503 in FIG. 5).

As indicated hereinbefore, the steps of the process depicted in FIG. 5 may be performed manually, be implemented in software, etc., utilizing techniques well within the purview of those skilled in the art. Several of these steps will be elaborated upon hereinafter to illustrate preferred techniques for practicing the invention.

For example, step 503, according to a preferred embodiment of the invention, further comprises the steps of: (a) determining for each site in the overlapping portion of at least two partitions, the site's primary partition; (b) determining for each site in the overlapping portion of at least two partitions, the site's secondary partitions; and (c) adding the primary and secondary partition information determined in steps (a) and (b) for a given site to a site profile record associated with and maintained by the given site.

Further process steps contemplated by a preferred embodiment of the invention include: (a) initializing a set of site profile records, maintained by each site belonging to the overlapping portion of at least two partitions, to include, in each record associated with a site not belonging to the overlapping portion of at least two partitions: (1) the same primary partition information added to the site profile record associated with and maintained by the given site, and (2) an indication that no secondary partition information exists for any site not included in the overlapping portion of at least two partitions; and (b) attaching each site in the set of sites to the point-to-point communications network.

Still further, a preferred technique for performing the aforementioned step of "attaching" each site in the set of sites to the point-to-point communications network, includes the steps of: (a) calling any site in the communications network, from a site to be attached to the communications network, to retrieve site profile records for every existing site in the communications network; (b) utilizing the calling site to retrieve the site profile records; (c) discarding those site profile records retrieved by the calling site which have primary partition information that is different from the calling site's primary partition information and which have secondary partition information indicating that the site associated with the retrieved profile record can not communicate with any of the partitions that the calling site can communicate with; (d) calling, from the site to be attached to the communications network, all sites for which the site to be attached received and did not discard a site profile record in step (c); and (e) sending the calling sites own site profile record to each site called; but not sending the calling site's primary and secondary information to those site in the communications network having a site profile record indicating that no secondary partition information exists.

A preferred version of the process depicted in FIG. 5 would also insure that each site in a given set of overlapping partitions is assigned a site identifier which is unique across all partitions in the set of overlapping partitions.

Figure 6:
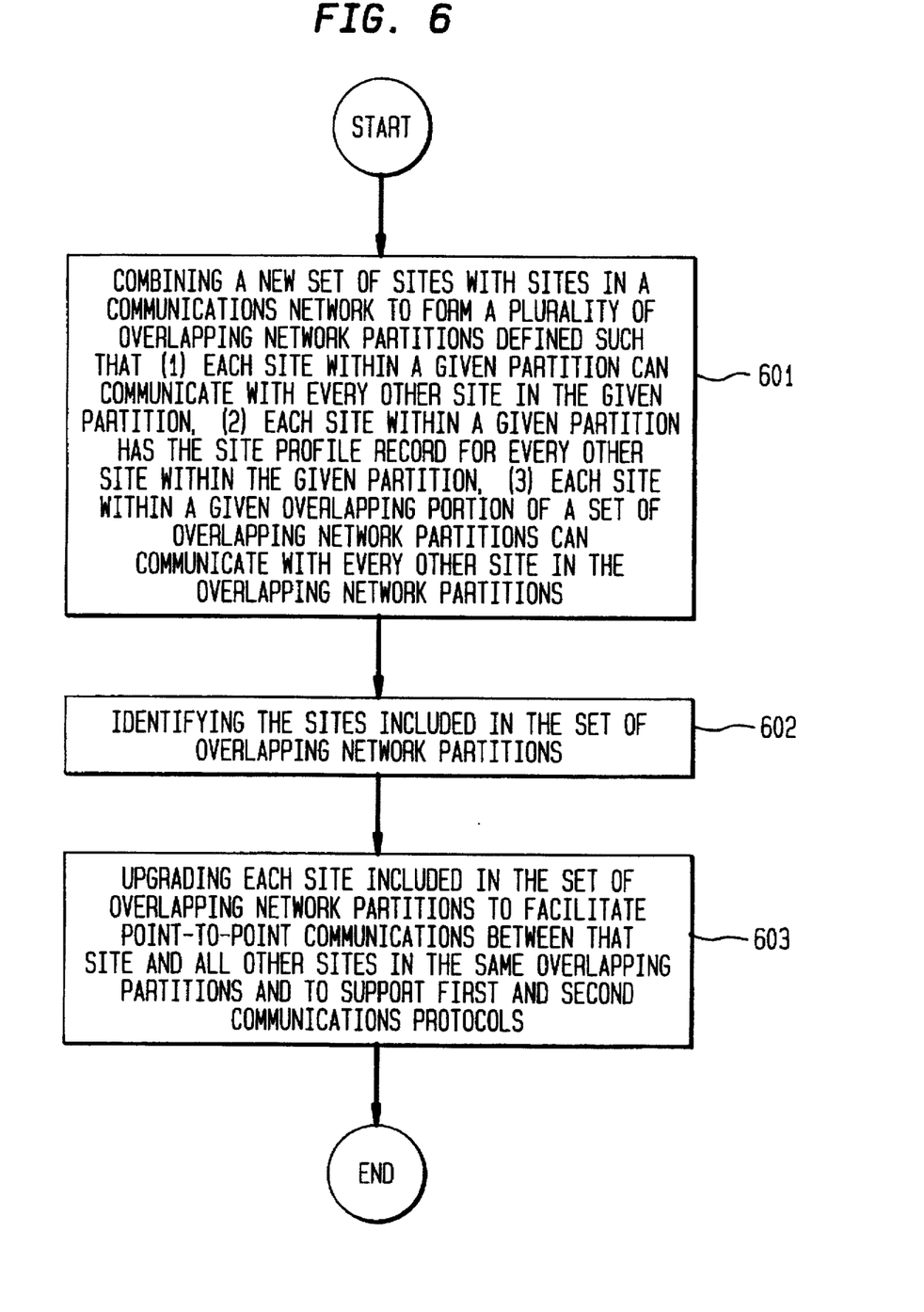
FIG. 6 illustrates, in the form of a flowchart, an example of the process steps contemplated by one embodiment of the invention for extending a fully connected point-to-point communications network by attaching a new set of sites to the network wherein at least one site in the new set of sites supports a first communications protocol that is different from a second communications protocol supported by the network.

Reference should now be made to FIG. 6 which illustrates, in the form of a flowchart, an example of the process steps contemplated by one embodiment of the invention for extending a fully connected point-to-point communications network by attaching a new set of sites to the network wherein at least one site in the new set of sites supports a first communications protocol that is different from a second communications protocol supported by the network.

An illustrative set of process steps for realizing this aspect of the invention, as shown in FIG. 6, includes the steps of:

(a) combining the new set of sites with the sites in the communications network to form a plurality of overlapping network partitions defined such that (1) each site within a given partition may communicate with every other site in the given partition, (2) each site within a given partition has the site profile record for every other site within the given partition, and (3) each site within a given overlapping portion of a set of overlapping network partitions may communicate with every other site in the set of overlapping network partitions (as schematically represented by step 601 in FIG. 6);

(b) identifying the sites included in the set of overlapping network partitions (as schematically represented by step 602 in FIG. 6); and (c) upgrading each site included in the set of overlapping network partitions to facilitate point-to-point communications between that site and all other sites in the same overlapping partitions and to support both the first and second communications protocols (as schematically represented by step 603 in FIG. 6).

The method steps summarized in FIG. 6 (for extending a fully connected point-to-point communications network by attaching a new set of sites to the network wherein at least one site in the new set of sites supports a first communications protocol that is different from a second communications protocol supported by the network), like those described with reference to FIG. 5, may be practiced in a variety of ways without departing from the spirit or scope of the invention. However, the preferred processes contemplated by the invention perform the steps of "upgrading" and "attaching", in much the same manner as explained hereinabove with reference to the site attachment process summarized in FIG. 5.

Figure 7:
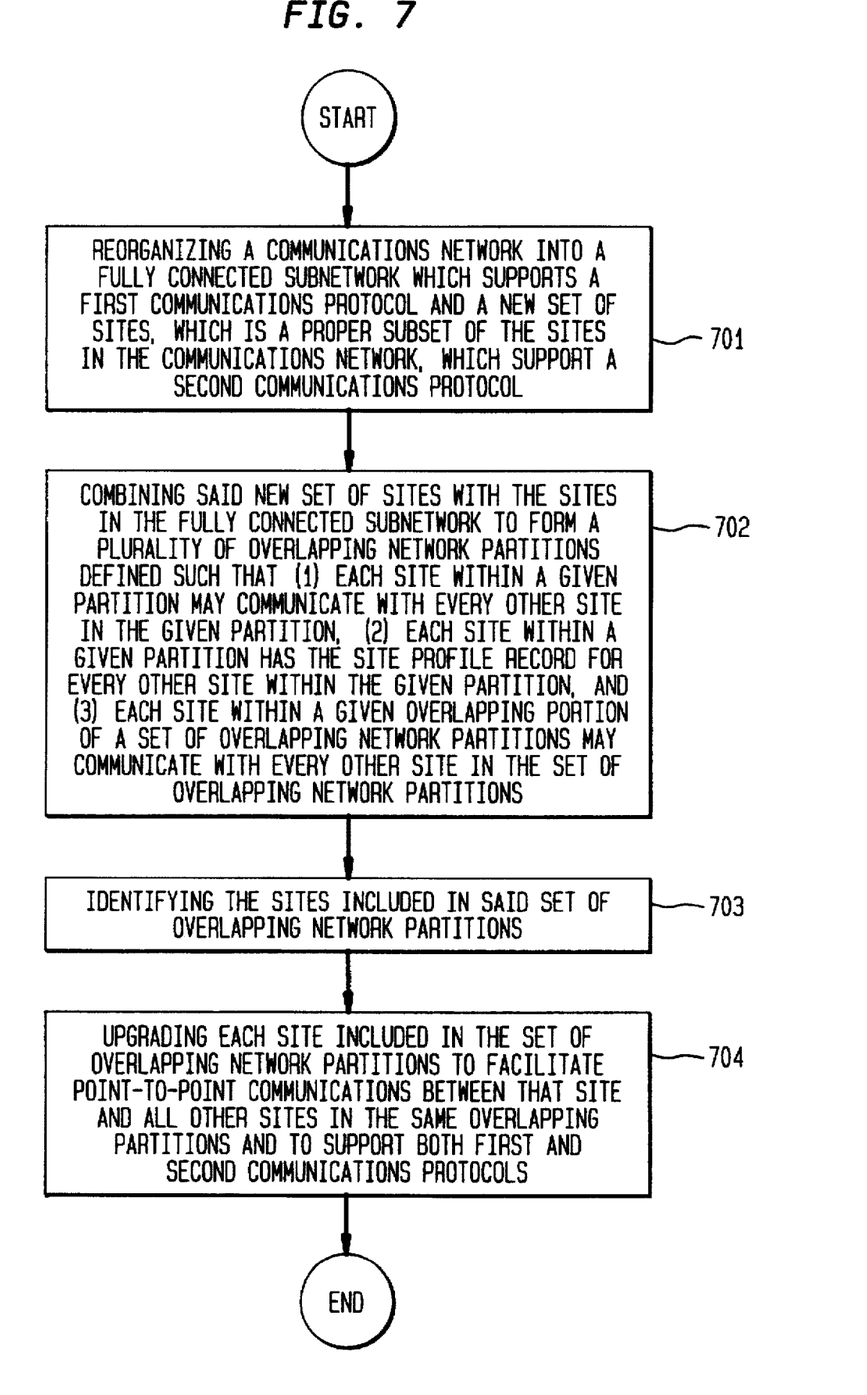
FIG. 7 illustrates, in the form of a flowchart, an example of the process steps contemplated by one embodiment of the invention for modifying a fully connected point-to-point communications network which supports a first communications protocol, to support a second communications protocol on a fully connected proper subnetwork of said communications network.

Finally, FIG. 7 illustrates, in the form of a flowchart, an example of the process steps contemplated by one embodiment of the invention for modifying a fully connected point-to-point communications network which supports a first communications protocol, to support a second communications protocol on a fully connected proper subnetwork of said communications network.

An illustrative set of process steps for realizing this aspect of the invention, as shown in FIG. 7, includes the steps of:

(a) reorganizing said communications network into a fully connected subnetwork which supports said first communications protocol and a new set of sites, which is a proper subset of the sites in said communications network, which support said second communications protocol (as schematically represented by step 701 in FIG. 7);

(b) combining said new set of sites with the sites in said fully connected subnetwork to form a plurality of overlapping network partitions defined such that (1) each site within a given partition may communicate every other site in said given partition, (2) each site within a given partition has the site profile record for every other site within said given partition, and (3) each site within a given overlapping portion of a set of overlapping network partitions may communicate with every other site in said set of overlapping network partitions (as schematically represented by step 702 in FIG. 7);

(c) identifying the sites included in said set of overlapping network partitions (as schematically represented by step 703 in FIG. 7); and (d) upgrading each site included in said set of overlapping network partitions to facilitate point-to-point communications between that site and all other sites in the same overlapping partitions and to support both said first and second communications protocols (as schematically represented by step 704 in FIG. 7).

Once again, the method steps summarized in FIG. 7 (for modifying a fully connected point-to-point communications network which supports a first communications protocol, to support a second communications protocol on a fully connected proper subnetwork of said communications network), like those described with reference to FIGS. 5 and 6, may be practiced in a variety of ways without departing from the spirit or scope of the invention. However, the preferred processes contemplated by the invention perform the steps of "upgrading" and "attaching", in much the same manner as explained hereinabove.

What has been described in detail hereinabove are methods and apparatus meeting all of the aforestated objectives.

As previously indicated, those skilled in the art will recognize that the foregoing description has been presented for the sake of illustration and description only. It is not intended to be exhaustive or to limit the invention to the precise form disclosed, and obviously many modifications and variations are possible in light of the above teaching.

The embodiments and examples set forth herein were presented in order to best explain the principles of the instant invention and its practical application to thereby enable others skilled in the art to best utilize the instant invention in various embodiments and with various modifications as are suited to the particular use contemplated.

It is, therefore, to be understood that the claims appended hereto are intended to cover all such modifications and variations which fall within the true scope and spirit of the invention.

What is claimed is:

1. A method for attaching a new set of sites to a fully connected point-to-point communications network having a predetermined maximum number of sites associated therewith, wherein at least one site in said new set of sites does not need to communicate with every site in said fully connected point-to-point communications network, comprising the steps of:

(a) partitioning said fully-connected network into a plurality of subsets of said sites comprising said fully-connected network, wherein the sites comprising each said partitioned subset form a fully connected subnetwork and further wherein at least one overlapping portion of at least two of said partitioned subsets is formed, each said overlapping portion being comprised of sites that are in at least two of said fully connected subnetworks;

(b) combining the sites in said new set of sites with the sites in at least one of said partitioned subsets;

(c) identifying the sites included in each said overlapping portion; and (d) upgrading a set of communications parameters for each site that is in one of said overlapping portions, said parameters defining an ability for intercommunication among a plurality of sites, whereby point-to-point communications is enabled between each said overlap site and all other sites that are in said at least two of said fully connected subnetworks which include said overlap portion.

2. A method as set forth in claim 1 wherein said step of upgrading further comprises the steps of:

(a) determining for each site in said overlapping portions, the site's primary partition;

(b) determining for each site in said overlapping portions, the site's secondary partitions; and (c) adding the primary and secondary partition information determined in steps (a) and (b) for a given site to a site profile record associated with and maintained by said given site.

3. A method as set forth in claim 2 further comprising the steps of:

(a) initializing a set of site profile records maintained by each site belonging to one of said overlapping portions, to include, in each record associated with a site located outside of said overlapping portion and with which communication is to be established:

(1) the same primary partition information added to the site profile record associated with and maintained by said given site, and (2) an indication that no secondary partition information exists for any of said non-overlap sites; and (b) attaching each site represented in said set of site profile records to the point-to-point communications network.

4. A method as set forth in claim 3 wherein said step of attaching each site in said set of sites to the point-to-point communications network further comprises the steps of:
    (a) calling any site in the communications network, from a site to be attached to the communications network, to retrieve site profile records for every existing site in the communications network;
    (b) utilizing said calling site to retrieve said site profile records;
    (c) discarding those site profile records retrieved by the calling site which have primary partition information that is different from the calling site's primary partition information and which have secondary partition information indicating that the site associated with the retrieved profile record can not communicate with any of the partitions that the calling site can communicate with;
    (d) calling, from said site to be attached to the communications network, all sites for which the site to be attached received and did not discard a site profile record in step (c); and
    (e) sending the calling sites own site profile record to each site called; but not sending the calling site's primary and secondary information to those site in the communications network having a site profile record indicating that no secondary partition information exists.

5. A method as set forth in claim 1 wherein each site in a given set of overlapping partitions is assigned a site identifier which is unique across all partitions in said set of overlapping partitions.

6. In a fully connected point-to-point communications network having a predetermined maximum number of sites associated therewith, wherein at least one site in a new set of sites does not need to communicate with every site in said fully connected point-to-point communications network, the improvement therein, whereby said new set of sites can be added to said network, comprising:
    a plurality of subsets of sites partitioned from said network, characterized in that the sites comprising each said partitioned subset form a fully connected subnetwork and being further characterized in that at least one overlapping portion of at least two of said partitioned subsets is formed, each said overlapping portion being comprised of sites that are in at least two of said fully connected subnetworks;
    means for combining the sites in said additional set of sites with the sites in at least one of said partitioned subsets;
    means for identifying the sites included in each said overlapping portion; and
    means for upgrading a set of communications parameters for each site that is in one of said overlapping portions, said parameters defining an ability for intercommunication among a plurality of sites, whereby point-to-point communications is enabled between each aid overlap site and all other sites that are in aid at least two of said fully connected subnetworks including said overlap portion.

7. The partitioned point-to-point communications network as set forth in claim 6 in which the maximum number of sites for aid improved network may exceed the predetermined maximum number of sites associated with said fully connected point-to-point communications network.

8. The partitioned point-to-point communications network as set forth in claim 6 wherein a communications protocol is supported in at least one of said subnetworks that is incompatible with a communications protocol supported by another of said subnetwork.

9. A partitioned point-to-point communications network as set forth in claim 6 which inherently prevents network users from sending unauthorized messages to sites within the network.

10. A partitioned point-to-point communications network as set forth in claim 6 which does not require all sites in the existing network to be upgraded whenever a new communications protocol is introduced.

11. A partitioned point-to-point communications network as set forth in claim 6 which minimizes the database size requirements for the database maintained at each site in the network by excluding, from each such database, records associated with any site which can not be called from the site maintaining the database.

12. A partitioned point-to-point communications network as set forth in claim 6 which minimizes the number of sites that need to be called when the profile record for any one site changes by excluding, from the set of sites to be called, any site which can not be directly called from the site maintaining the database.

13. A method for extending a fully connected point-to-point communications network which has a predetermined maximum number of sits associated therewith and a site profile record associated with each site, by attaching a new set of sites to said network, wherein at least one site in said new set of sites does not need to communicate with every site in said fully connected point-to-point communications network and further wherein at least one site in said new set of sites supports a first communications protocol that is different from a second communications protocol supported by said network, comprising the steps of:
    (a) partitioning said fully-connected network into a plurality of subsets of said sites comprising said fully-connected network wherein at least one overlapping portion of at least two of said partitioned subsets is formed such that (1) each site within a given partition is able to communicate with every other site in said given partition, (2) each site within a given partition has the site profile record for every other site within said given partition, and (3) each site within a given overlapping portion of a set of overlapping partitions is able to communicate with every other site in said set of overlapping partitions;
    (b) combining the sites in said new set of sites with the sites in at least one of said partitioned subsets;
    (c) identifying the sites included in each said set of overlapping partitions; and
    (d) upgrading a set of communications parameters for each site included in one of said sets of overlapping partitions, said parameters defining an ability for intercommunication among a plurality of sites, whereby point-to-point communications is enabled between each said overlap site and all other sites in the same overlapping partitions and to support both said first and second communications protocols.

14. A method as set forth in claim 13 wherein said first and second communications protocols are incompatible with one another.

15. A method as set forth in claim 13 wherein said step of upgrading further comprises the steps of:
    (a) determining for each site in the overlapping portion of at least two partitions, the site's primary partition;
    (b) determining for each site in the overlapping portion of at least two partitions, the site's secondary partitions; and (c) adding the primary and secondary partition information determined in steps (a) and (b) for a given site to a site profile record associated with and maintained by said given site.

16. A method as set forth in claim 15 further comprising the steps of:
   (a) initializing the set of site profile records, maintained by each site belonging to the overlapping portion of at least two partitions, to include, in each record associated with a site not belonging to said overlapping portion of at least two partitions: (1) the same primary partition information added to the site profile record associated with and maintained by said given site, and (2) an indication that no secondary partition information exists for any site not included in said overlapping portion of at least two partitions; and
   (b) attaching each site represented in said set of site profile records to the point-to-point communications network.

17. A method as set forth in claim 16 wherein said step of attaching each site represented in said set of site profile records to the point-to-point communications network further comprises the steps of:
   (a) calling any site in the communications network, from a site to be attached to the communications network, to retrieve site profile records for every existing site in the communications network;
   (b) utilizing said calling site to retrieve said site profile records;
   (c) discarding those site profile records retrieved by the calling site which have primary partition information that is different from the calling site's primary partition information and which have secondary partition information indicating that the site associated with the retrieved profile record can not communicate with any of the partitions that the calling site can communicate with;
   (d) calling, from said site to be attached to the communications network, all sites for which the site to be attached received and did not discard a site profile record in step (c); and
   (e) sending the calling sites own site profile record to each site called; but not sending the calling site's primary and secondary information to those site in the communications network having a site profile record indicating that no secondary partition information exists.

18. A method as set forth in claim 13 wherein each site in a given set of overlapping partitions is assigned a site identifier which is unique across all partitions in said set of overlapping partitions.

19. In a fully connected point-to-point communications network having a predetermined maximum number of sites associated therewith and a site profile record associated with each site, wherein at least one site in a new set of sites does not need to communicate with every site in said fully connected point-to-point communications network and further wherein at least one site in said new set of sites supports a first communications protocol that is different from a second communications protocol supported by said network, the improvement therein whereby said new set of sites can be added to said network, comprising,
   a plurality of subsets of sites partitioned from said network, characterized in that at least one overlapping portion of sites comprising at least two of said partitioned subsets is formed, wherein (1) each site within a given partition is able to communicate with every other site in said given partition, (2) each site within a given partition has the site profile record for every other site within said given partition, and (3) each Site within a given overlapping portion of a set of overlapping partitions is able to communicate with every other site in said set of overlapping partitions;
   means for combining the sites in said additional set of sites with the sites in at least one of said partitioned subsets;
   means for identifying the sites included in each said overlapping portion; and
   means for upgrading a set of communications parameters for each site that is in one of said overlapping portions, said parameters defining an ability for intercommunication among a plurality of sites, whereby point-to-point communications is enabled between each said overlap site and all other sites which are in the same overlap partition, and both said first and second communications protocols are supported.

20. A method for modifying a fully connected point-to-point communications network which supports a first communications protocol, to support a second communications protocol on a fully connected proper subnetwork of said communications network, comprising the steps of:
   (a) reorganizing said communications network into a fully connected subnetwork which supports said fist communications protocol and a new set of sites, which is a proper subset of the sites in said communications network, which support said second communications protocol;
   (b) combining said new set of sites with the sites in said fully connected subnetwork to form a plurality of overlapping network partitions defined such that (1) each site within a given partition is able to communicate with every other site in said given partition, (2) each site within a given partition has the site profile record for every other site within a given partition, and (3) each site within a given overlapping portion of a set of overlapping network partitions is able to communicate with every other site in said set of overlapping network partitions;
   (c) identifying the sites included in said set of overlapping network partitions; and
   (d) upgrading a set of communications parameters for each site included in said set of overlapping network, said parameters defining an ability for intercommunication among a plurality of sites, whereby point-to-point communications is enabled between that site and all other sites in the same overlapping partitions and both said first and second communications protocols are supported.

21. A method as set forth in claim 20 wherein said first and second communications protocols are incompatible with one another.

22. A method as set forth in claim 20 wherein said step of upgrading further comprises the steps of:
   (a) determining for each site in the overlapping portion of at least two partitions, the site's primary partition;
   (b) determining for each site in the overlapping portion of at least two partitions, the site's secondary partitions; and
   (c) adding the primary and secondary partition information determined in steps (a) and (b) for a given site to a site profile record associated with and maintained by said given site.

23. A method as set forth in claim 22 further comprising the steps of:

(a) initializing the set of site profile records, maintained by each site belonging to the overlapping portion of at least two partitions, to include, in each record associated with a site not belonging to said overlapping portion of at least two partitions: (1) the same primary partition information added to the site profile record associated with and maintained by said given site, and (2) an indication that no secondary partition information exists for any site not included in said overlapping portion of at least two partitions; and (b) attaching each site represented in said set of site profile records to the point-to-point communications network.

24. A method as set forth in claim 23 wherein said step of attaching each site represented in said set of site profile records to the point-to-point communications network further comprises the steps of:

(a) calling any site in the communications network, from a site to be attached to the communications network, to retrieve site profile records for every existing site in the communications network;

(b) utilizing said calling site to retrieve said site profile records;

(c) discarding those site profile records retrieved by the calling site which have primary partition information that is different from the calling site's primary partition information and which have secondary partition information indicating that the site associated with the retrieved profile record can not communicate with any of the partitions that the calling site can communicate with;

(d) calling, from said site to be attached to the communications network, all sites for which the site to be attached received and did not discard a site profile record in step (c); and (e) sending the calling sites own site profile record to each site called; but not sending the calling site's primary and secondary information to those site in the communications network having a site profile record indicating that no secondary partition information exists.

25. A method as set forth in claim 20 wherein each site in a given set of overlapping partitions is assigned a site identifier which is unique across all partitions in said set of overlapping partitions.

26. A partitioned point-to-point communications network that is the product of the process set forth in claim 20.

* * * * *